(12) United States Patent
Brown et al.

(10) Patent No.: US 9,262,057 B2
(45) Date of Patent: Feb. 16, 2016

(54) PROVIDING ITEM SPECIFIC FUNCTIONALITY VIA SERVICE-ASSISTED APPLICATIONS

(75) Inventors: Jared Adam Brown, Kirkland, WA (US); Sunil Sudhakar Pandith, Bellevue, WA (US); Yanshu Fan, Redmond, WA (US); Kerri Irene Higgins Sheldon, London (GB); Gavin Dean Lazarow, Bellevue, WA (US); Lejie Xu, Redmond, WA (US)

(73) Assignee: Microsoft Techology Licensing, LLC, Redmond, WA (US)

( * ) Notice: Subject to any disclaimer, the term of this patent is extended or adjusted under 35 U.S.C. 154(b) by 1377 days.

(21) Appl. No.: 13/045,541

(22) Filed: Mar. 11, 2011

(65) Prior Publication Data

US 2012/0233567 A1    Sep. 13, 2012

(51) Int. Cl.
| | | |
|---|---|---|
| *G06F 3/0481* | (2013.01) | |
| *G06F 3/0482* | (2013.01) | |
| *G06F 9/44* | (2006.01) | |
| *G06Q 30/02* | (2012.01) | |
| *G06Q 30/06* | (2012.01) | |

(Continued)

(52) U.S. Cl.
CPC .............. *G06F 3/0484* (2013.01); *G06F 9/445* (2013.01); *G06Q 30/0253* (2013.01); *G06Q 30/0281* (2013.01); *G06Q 30/0601* (2013.01); *G06Q 30/0631* (2013.01); *G06Q 30/0641* (2013.01); *G06F 3/0481* (2013.01); *G06F 3/0482* (2013.01); *G06F 9/4443* (2013.01); *H04N 5/44543* (2013.01)

(58) Field of Classification Search
CPC ... G06F 3/0481; G06F 3/0482; G06F 9/4443; G06Q 30/0253; G06Q 30/0281; G06Q 30/0601; G06Q 30/0641; H04N 5/44543
USPC .............. 705/26.1, 26.41, 346; 715/210, 810, 715/812
See application file for complete search history.

(56) References Cited

U.S. PATENT DOCUMENTS

| 6,996,816 B1 | 2/2006 | Bohan |
| 7,565,641 B2 | 7/2009 | Maxa et al. |

(Continued)

OTHER PUBLICATIONS

Knorr, Eric, "What could computing really means," Apr. 7, 2008, retrieved from www.infoworld.com/print/34031 on Jun. 13, 2014.*

(Continued)

*Primary Examiner* — Eric J Bycer
(74) *Attorney, Agent, or Firm* — Bryan Webster; Kate Drakos; Micky Minhas

(57) ABSTRACT

Embodiments extend functionality of a first application with actions from one or more second applications specifically applicable to a content item selected by a user. The selected content item belongs to a category. A description of the selected content item distinguishes the selected content item from other content items in the same category. At least one of a plurality of second applications is selected based on a comparison between the description and application data associated with the second applications. The computing device identifies, to the user, the actions from the second applications applicable to the selected content item. Upon selection of an action, the computing device executes the corresponding second application and provides output data within the context of the first application, or otherwise integrated with the first application experience. In some embodiments, the computing device offers the user execution of a third party application specifically applicable to the selected content item.

20 Claims, 6 Drawing Sheets

(51) Int. Cl.
*H04N 5/445* (2011.01)
*G06F 3/0484* (2013.01)
*G06F 9/445* (2006.01)

(56) References Cited

U.S. PATENT DOCUMENTS

| | | | |
|---|---|---|---|
| 7,693,861 B2 | 4/2010 | Mital et al. | |
| 8,627,223 B1* | 1/2014 | Katzer et al. | 715/765 |
| 2001/0013052 A1* | 8/2001 | Benjamin et al. | 709/203 |
| 2002/0002673 A1* | 1/2002 | Narin | 713/152 |
| 2002/0037713 A1* | 3/2002 | Kato | 455/414 |
| 2004/0049544 A1* | 3/2004 | Kuroda et al. | 709/204 |
| 2004/0230636 A1* | 11/2004 | Masuoka et al. | 708/800 |
| 2005/0177616 A1* | 8/2005 | Addington et al. | 709/203 |
| 2005/0201291 A1* | 9/2005 | Gluck | 370/241 |
| 2005/0246726 A1* | 11/2005 | Labrou et al. | 719/328 |
| 2007/0101291 A1* | 5/2007 | Forstall et al. | 715/805 |
| 2007/0256073 A1* | 11/2007 | Troung et al. | 718/1 |
| 2009/0030902 A1 | 1/2009 | Aharoni et al. | |
| 2009/0157805 A1* | 6/2009 | McColgan et al. | 709/203 |
| 2009/0288071 A1 | 11/2009 | Seidman et al. | |
| 2009/0313601 A1* | 12/2009 | Baird et al. | 717/106 |
| 2010/0057983 A1* | 3/2010 | Borras et al. | 711/105 |
| 2010/0251340 A1 | 9/2010 | Martin et al. | |
| 2011/0314004 A1* | 12/2011 | Mehta | 707/723 |
| 2012/0016678 A1* | 1/2012 | Gruber et al. | 704/275 |

OTHER PUBLICATIONS

Gens, Frank, "Defining 'Cloud Services' and 'Cloud Computing'," Sep. 23, 2008, retrieved from blogs.idc.com/ie/?p=190 on Jun. 13, 2014.*
"Cloud computing," archive of en.wikipedia.org/wiki/Cloud_computing from Mar. 9, 2011, retrieved from the Internet Archive (web.archive.org) on Jun. 13, 2014.*
Gruber, Tom, "Ontology," Encyclopedia of Data Systems, Spring-Verlag, 2009 (2 pages).*
Clarke, et al., "An Efficient Component Model for the Construction of Adaptive Middleware", Retrieved at << http://www.eecg.toronto.edu/~jacobsen/courses/ece1770/reader/opencom.pdf >>, IFIP/ACM International Conference on Distributed Systems Platforms, Nov. 12-16, 2001, pp. 160-178.
Jade, et al., "Apple's iPhone 4.0 software to deliver multitasking support", Retrieved at << http://www.appleinsider.com/articles/10/03/11/apples_iphone_4_0_software_to_deliver_multitasking_support.html >>, Mar. 11, 2010, pp. 4.

* cited by examiner

PROVIDING ITEM SPECIFIC FUNCTIONALITY VIA SERVICE-ASSISTED APPLICATIONS

BACKGROUND

For mobile devices, an increasing quantity of third party applications is available from online mobile marketplaces. Users browse the applications and install the applications to extend the functionality of the mobile devices. The installed third party applications are generally operable with certain types or categories of files. For example, a third party image editor may be operable with image files generally, such as all bitmap files or all joint photographic experts group (JPEG) files. Selecting among several different third party image editors, however, is difficult.

The existing mechanisms for selecting among the third party applications are generally limited to selection based on the types or categories of files or data supported by the third party applications. The existing mechanisms lack, for example, sufficient context about the files or data on the mobile device to enable intelligent selection or recommendation.

SUMMARY

Embodiments of the disclosure provide a user with functionality specific to a content item. A computing device receives, from a user, a selection of at least one of a plurality of content items displayed by a first application. The selected content item belongs to a category. A description of the selected content item distinguishing the selected content item from other content items in the same category is defined. At least one of a plurality of second applications is selected based on a comparison between the defined description and application data. The application data is associated with the plurality of second applications. The computing device provides the user with the selected content item, at least a portion of the defined description, and identification of the selected second application. A request is received from the user to execute the selected second application. In response to the received request, the computing device executes the selected second application using the selected content item and at least a portion of the defined description as input to produce output data. The output data is provided to the user for display within the context of, or otherwise integrated with, the first application. In some embodiments, a service selects the second application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
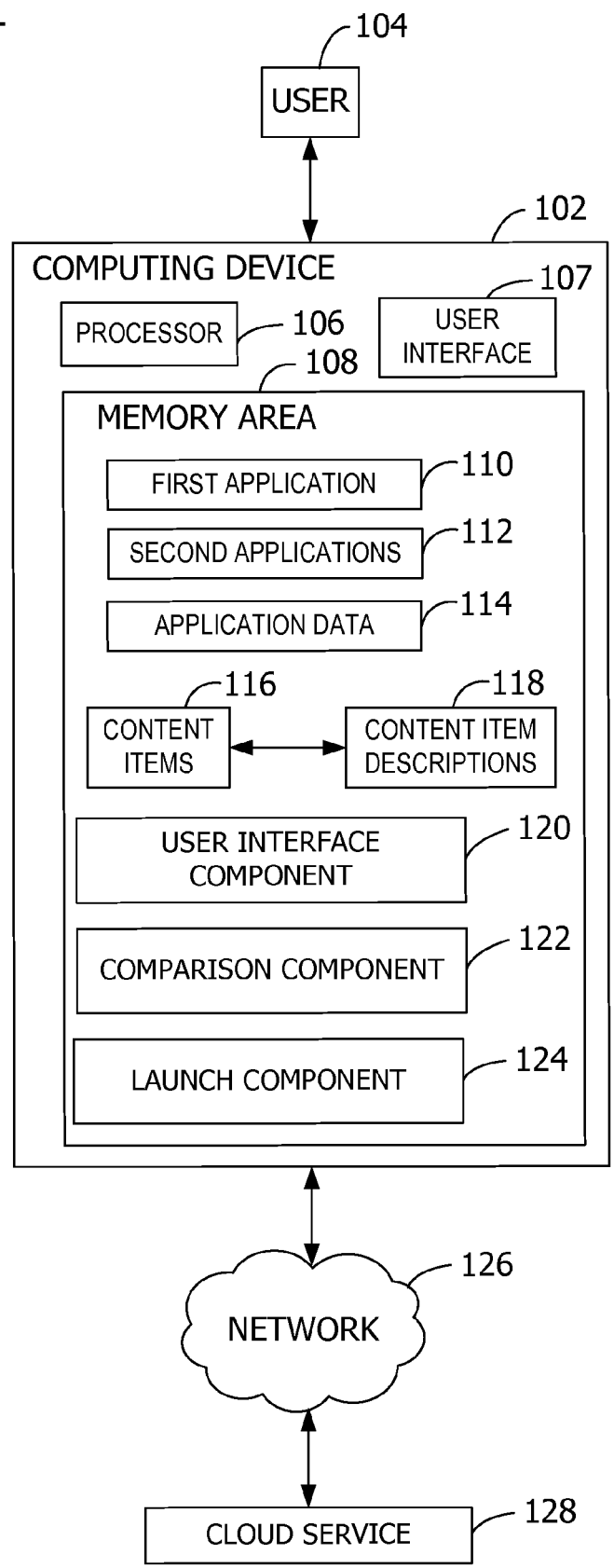
FIG. 1 is an exemplary block diagram illustrating a computing device providing content items and one or more second applications specific to each of the content items.

Referring to the figures, embodiments of the disclosure enable an application (e.g., a first application 110) to extend functionality with third party applications (e.g., second applications 112) specific to a content item 116 selected by a user 104. In some embodiments, a mobile computing device or cloud service 128 selects one or more of the third party applications based on a comparison between a content item description 118 and application data 114 provided by third party application providers 302. Execution of the selected third party application and output from the execution occurs within the context of the first application 110 to provide an integrated experience for the user 104, in accordance with some aspects of the disclosure.

In some embodiments, the cloud service 128 provides a computing device 102 with the application data 114 identifying the third party applications from the third party application providers 302, actions supported by each of the third party application providers 302, and identifiers of specific content items 116 supported by each of the applications. While the user 104 browses or selects content items 116, the computing device 102 identifies the actions applicable to the content items 116 and may identify the third party application corresponding to the actions. The actions, or third party applications, not relevant or applicable to the content items 116 are not surfaced. When the user 104 requests performance of one or more of the actions, the computing device 102 executes the corresponding third party applications to extend the user experience for the content items 116.

In some embodiments, different applications are linked to different actions for the same content item 116. In this manner, the different applications may be coordinated by the first application 110 to provide a cohesive user experience within the context of the first application 110. Executing the second application 112 and/or providing the output data within the context of the first application 110 preserves battery life and bandwidth as execution context is preserved, redundant or irrelevant data is not loaded, and additional screens for the second application 112 are not loaded.

Referring next to FIG. 1, an exemplary block diagram illustrates the computing device 102 providing content items 116 and one or more second applications 112 specific to each of the content items 116. In the example of FIG. 1, the computing device 102 is associated with at least one user 104. The computing device 102 represents any device executing instructions (e.g., as application programs, operating system functionality, or both) to implement the operations and functionality associated with the computing device 102. The computing device 102 may include a mobile computing device or any other portable device. In some embodiments, the mobile computing device includes a mobile telephone, laptop, netbook, gaming device, and/or portable media player. The computing device 102 may also include less portable devices such as desktop personal computers, kiosks, and tabletop devices. Additionally, the computing device 102 may represent a group of processing units or other computing devices.

The computing device 102 has at least one processor 106, a memory area 108, and at least one user interface 107. The processor 106 includes any quantity of processing units, and is programmed to execute computer-executable instructions for implementing aspects of the disclosure. The instructions may be performed by the processor 106 or by multiple processors executing within the computing device 102, or performed by a processor external to the computing device 102. In some embodiments, the processor 106 is programmed to execute instructions such as those illustrated in the figures (e.g., FIG. 2 and/or FIG. 3).

The computing device 102 further has one or more computer readable media such as the memory area 108. The memory area 108 includes any quantity of media associated with or accessible by the computing device 102. The memory area 108 may be internal to the computing device 102 (as shown in FIG. 1), external to the computing device 102 (not shown), or both (not shown).

The memory area 108 stores, among other data, one or more applications. The applications, when executed by the processor 106, operate to perform functionality on the computing device 102. Exemplary applications include mail application programs, web browsers, calendar application programs, address book application programs, messaging programs, media applications, location-based services, search programs, and the like. The applications may communicate with counterpart applications or services such as web services accessible via a network 126. For example, the applications may represent downloaded client-side applications that correspond to server-side services executing in a cloud (e.g., cloud service 128). In some embodiments, each of the applications may be operable with any type, format, or category of content item 116. In other embodiments, one or more of the applications may be operable only with specific content items 116. The applications may also represent functionality built-in to an operating system executing on the computing device 102 and/or functionality provided by third-party application providers and installed on the computing device 102.

In the example of FIG. 1, the memory area 108 stores at least one first application 110 and one or more second applications 112. The computing device 102 operates to provide to the user 104, through the first application 110, functionality from the second applications 112. The functionality is specific to at least one content item 116 selected by the user 104, computing device 102, or other entity. In this example, the first application 110 represents one of the applications available for execution by the computing device 102, and the second applications 112 represent additional functionality installed on the computing device 102. In an example in which the computing device 102 is a mobile computing device, the second applications 112 represent applications downloaded from an application marketplace and installed for execution by the computing device 102.

The memory area 108 further stores application data 114 for each of the second applications 112. The application data 114 is received from, for example, third party application providers 302, and may also be referred to as an application data feed. For each of the second applications 112, the application data 114 describes one or more of the following: actions associated with the second application 112, identifiers of content items 116 supported by or operable with the second application 112, identifiers of content items 116 not supported by or not operable with the second application 112, and an identifier of the third party application provider 302 providing the second application 112. The actions supported by the second application 112 represent routines, instructions, function calls, and the like for operating on the content items 116 supported by the second application 112.

The memory area 108 further stores content items 116. The content items 116 may be stored local to the computing device 102 as in FIG. 1 and/or remotely such as in a cloud storage area (e.g., cloud service 128). Each of the plurality of content items 116 is assigned to one of a plurality of categories. Exemplary categories include photographs, video clips, stores, restaurants, electronics, books, automotive parts, and jewelry. In some embodiments, each of the content items 116 has a content item description 118 associated therewith. The content item description 118 includes elements, criteria, context, and/or characteristics representative of the content item 116 that distinguish the content item 116 from other content items 116 assigned to the same category. For example, the content item description 118 may identify a particular search result item, a location of a landmark in a photograph, a size of a photograph, and/or other distinguishing characteristics of the content item 116. The content item description 118 may also include the results of analysis performed on the content item 116. For example, face recognition, landmark recognition, text analysis, and any other analysis may be performed on the content item 116 to identify the characteristics that distinguish the content item 116 from other content items 116 in the same category.

In other embodiments, each of the content items 116 includes the corresponding content item description 118.

The content item descriptions 118 may be created or defined by the computing device 102, user 104, and/or other device or other user. For example, the content item descriptions 118 may be defined by a search engine or other service storing or having access to the content item descriptions 118. In the example of FIG. 1, the content item descriptions 118 have been obtained by the computing device 102 and stored in the memory area 108 (e.g., cached).

The memory area 108 further stores one or more computer-executable components. Exemplary components include a user interface component 120, a comparison component 122, and a launch component 124. Execution of the components is described with reference to FIG. 2 below.

The computing device 102 communicates with the cloud service 128 to obtain any of the elements stored in the memory area 108. The computing device 102 communicates with the cloud service 128 via, for example, a network 126 such as the Internet.

Figure 2:
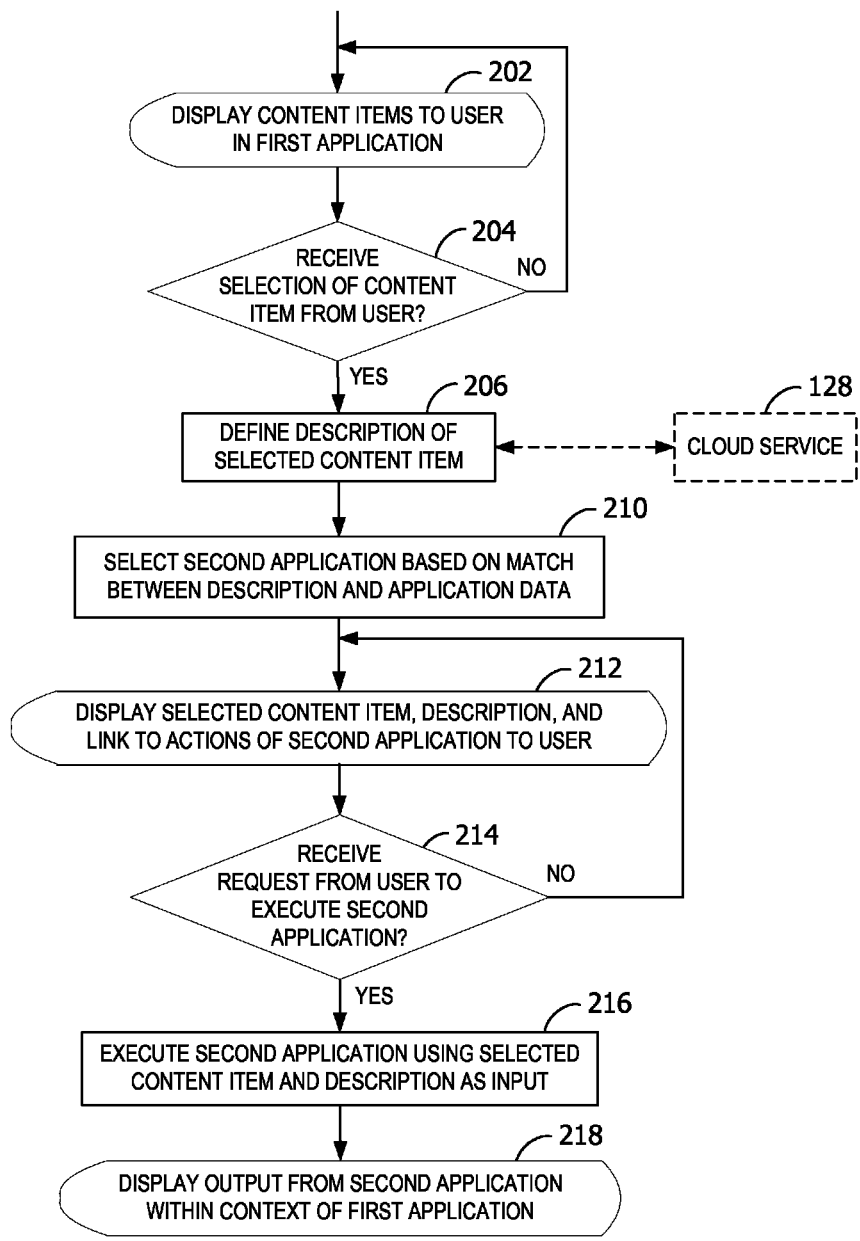
FIG. 2 is an exemplary flow chart illustrating operation of the computing device to obtain and provide functionality relevant to a selected content item.

Referring next to FIG. 2, an exemplary flow chart illustrates operation of the computing device 102 to obtain and provide functionality relevant to a selected content item 116. At 202, one or more of the content items 116 are displayed to the user 104 via the first application 110. Content items 116 from different categories may be displayed, or the content items 116 may be from the same category. For example, the user 104 is viewing search results in a web browser, viewing a slideshow of photographs or video clips in a media application, viewing a listing of nearby restaurants, etc.

If the computing device 102 receives a selection from the user 104 of at least one of the displayed content items 116 at 204, the computing device 102 defines the content item description 118 for the selected content item at 206. For example, the computing device 102 may obtain the content item description 118 from the memory area 108, from the cloud service 128 (optional), or from another storage area. In another example, the computing device 102 may perform an analysis of the selected content item 116 to create the content item description 118. In some embodiments, performing the analysis includes collecting metadata describing attributes, features, or other characteristics of the selected content item 116. The defined description of the selected content item 116 is of a granularity and specificity to distinguish the selected content item 116 from other content items 116 in the same category.

The computing device 102 compares the defined content item description 118 with the application data 114 to identify and select a matching second application 112 at 210. For example, the computing device 102 may identify the second application(s) 112 that have declared (via their application data 114) support for the specific selected content item 116. Aspects of the disclosure are also operable with second applications 112 that provide support in general for an entire category of content items 116.

In other embodiments, the computing device 102 identifies the selected content item 116 to the cloud service 128, which performs the comparison to identify one or more matching second applications 112. The computing device 102 then receives identification of the matching second applications 112 from the cloud service 128. In some embodiments, the computing device 102 also provides the defined content item description 118 to the cloud service 128 to enable the cloud service 128 to perform the comparison.

At 212, the computing device 102 displays to the user 104 one or more of the following: the selected content item 116, at least a portion of the associated content item description 118, and references to one or more of the actions available from the selected second application 112. In some embodiments, the computing device 102 displays the selected content item 116 and the actions available from the second application 112. The references and actions are identified in the application data 114 for the selected second application 112, in some embodiments. The references include, for example, user interface elements that, when selected or activated as next described, provide the user 104 with the associated action.

In some embodiments, details about the second application 112 are also made available to the user 104 (e.g., displayed, referenced via a hyperlink, etc.). For example, the name of the second application 112, application vendor, version number, rating, description of the actions, and the like may be displayed. In other embodiments, the details about the second application 112 are hidden from the user 104.

If the computing device 102 receives a request from the user 104 to execute one or more of the displayed actions at 214, the computing device 102 executes the second application 112 using the selected content item 116 and the associated content item description 118 as input at 216 (e.g., as arguments to a function call, as query string parameters in a uniform resource locator, etc.). In this manner, the user 104 does not need to find the second application 112 on the computing device 102, manually execute the second application 112, and enter the selected content item 116 and the associated content item description 118 into the second application 112. Execution of the second application 112 results in creation of output data.

Alternatively or in addition, the computing device 102 provides the selected content item 116 and/or associated content item description 118 to another device that executes the second application 112 and provides output data back to the computing device 102 for display. For example, a third party application provider 302 hosting the second application 112 may execute the second application 112 and provide the output data to the computing device 102.

At 218, the computing device 102 displays the output data from the second application 112 within the context of the first application 110. For example, the first application 110 displays the output data in a frame in a web browser. In another example, the output data is displayed as a popup or hover window. Alternatively or in addition, the computing device 102 provides the output data for display to the user 104. For example, the computing device 102 provides the output data to another device that displays the output data to the user 104.

In some embodiments, the computer-executable components illustrated in FIG. 1 execute to perform at least a portion of the functionality illustrated in FIG. 2. For example, the user interface component 120, when executed by the processor 106, causes the processor 106 to receive, from the user 104, a selection of at least one of a plurality of content items 116 displayed by the first application 110. In some embodiments, the user interface component 120 includes a graphics card for displaying data to the user 104 and receiving data from the user 104. The user interface component 120 may also include computer-executable instructions (e.g., a driver) for operating the graphics card. Further, the user interface component 120 may include a display (e.g., a touch screen display) and/or computer-executable instructions (e.g., a driver) for operating the display. The user interface component 120 may also include one or more of the following to provide data to the user 104 or receive data from the user 104: speakers, a sound card, a camera, a microphone, a vibration motor, and one or more accelerometers. For example, the user 104 may input commands or manipulate data by moving the computing device 102 in a particular way.

The comparison component 122, when executed by the processor 106, causes the processor 106 to select a plurality of the second applications 112 by matching a description of the selected content item 116 to application data 114 associated with the second applications 112. In some embodiments, each of the selected plurality of second applications 112 provides functionality different from that provided by other selected second applications 112. For example, one of the second applications 112 may provide lyrics for a song while another of the second applications 112 provides a video of the song.

The user interface component 120, when further executed, displays to the user 104 the selected content item 116, the plurality of second applications 112 selected by the comparison component 122, and/or one or more actions associated with the plurality of second applications 112. The user interface component 120 also receives a request from the user 104 to execute one or more of the selected second applications 112. For example, the user interface component 120 detects a selection by the user 104 of a user interface element corresponding to at least one of the selected second applications 112 and/or the actions associated therewith. The user interface elements include one or more of the following in some embodiments: text, an icon, a hyperlink, and an animation.

The launch component 124, when executed by the processor 106, causes the processor 106 to execute, in response to the request received by the user interface component 120, the selected second application(s) 112 using the selected content item 116 as input to produce output data. For example, the launch component 124 executes the selected second application 112 to perform the actions requested by the user 104. The user interface component 120 displays to the user 104, within the context of the first application 110, the output data produced by the launch component 124.

Figure 3:
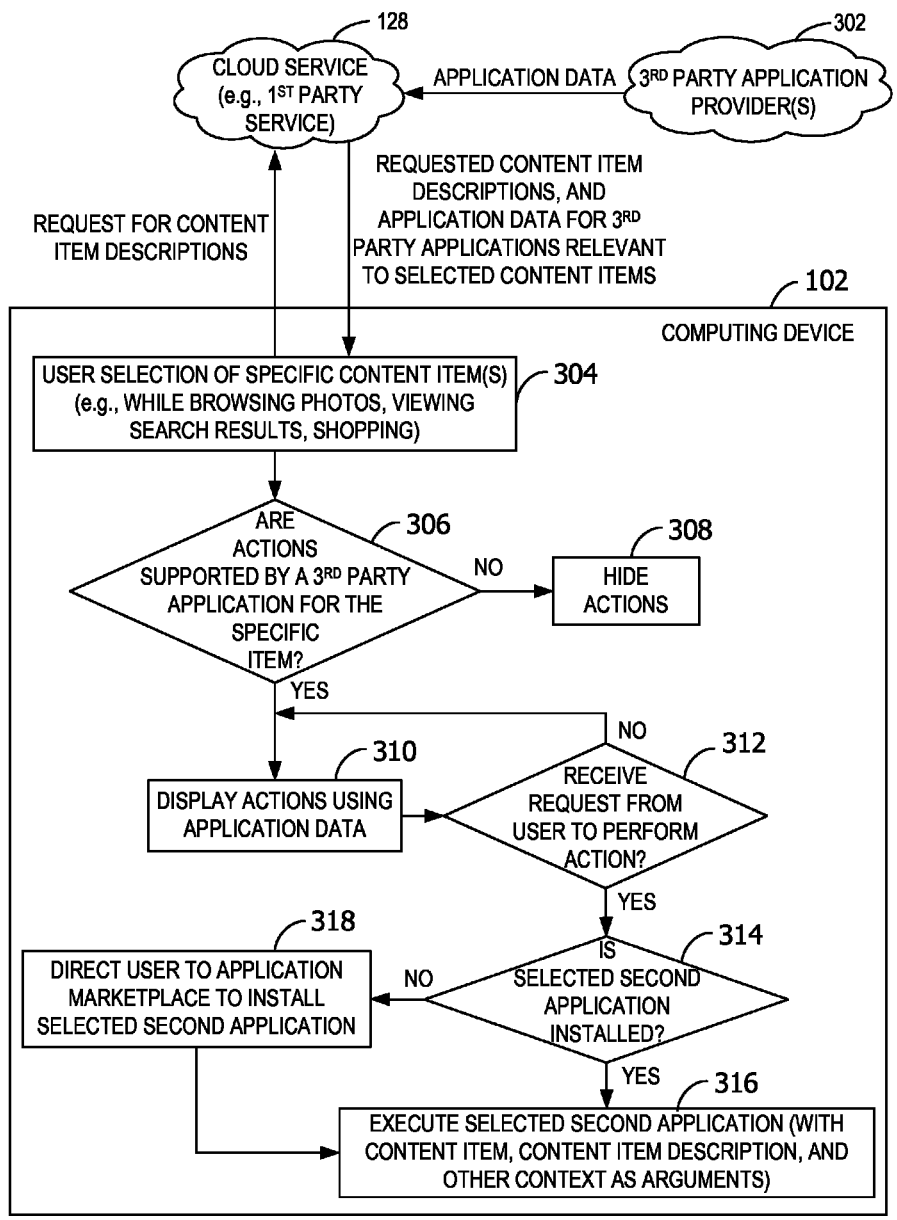
FIG. 3 is an exemplary block diagram illustrating interaction among the computing device, a cloud service, and one or more third party application providers.

Referring next to FIG. 3, an exemplary block diagram illustrates interaction among the computing device 102, the cloud service 128, and one or more third party application providers 302. In the example of FIG. 3, the computing device 102 communicates with the cloud service 128, and the cloud service 128 communicates with the third party application providers 302. The third party application providers 302 share the application data 114 describing the applications available from the third party application providers 302 with the cloud service 128. In other embodiments (not shown), the third party application providers 302 share the application data 114 directly with the computing device 102. In such embodiments, for example, the third party application providers 302 offer a device application for installation by the computing device 102 that provides access to the application data 114 from the third party application providers 302.

In the example of FIG. 3, the user 104 reviews content items 116 such as by viewing search results, browsing photographs, or viewing items available for purchase. When the user 104 requests additional information for one or more of the content items 116 or otherwise selects at least one of the content items 116 at 304, the computing device 102 requests the content item descriptions 118 for the selected content items 116. In the example of FIG. 3, the computing device 102 requests, and receives, the content item descriptions 118 from the cloud service 128. In other embodiments (not shown), the computing device 102 defines or creates the content item descriptions 118 without communicating with the cloud service 128 in response to the user selection.

Using the application data 114, the cloud service 128 also identifies third party applications (e.g., the second applications 112) that are operable on the selected content item 116. For example, the cloud service 128 compares the content item descriptions 118 for the selected content items 116 to the application data 114 received from the third party application providers 302. The cloud service 128 provides the application data 114 for the identified third party applications to the computing device 102. The computing device 102 may store the received application data 114 via, for example, a package manager in files such as application installation files, configuration files, or other data structures. The files may take the form of extensible markup language (XML) files.

In some embodiments, the XML files include properties identifying the specific content items 116 supported, the actions and functionality supported, and other metadata for use by the cloud service 128 and/or the computing device 102 in selecting and exposing the third party applications.

If, based on the application data 114, the computing device 102 determines that the identified third party applications provide actions for the specific selected content item 116 at 306, the computing device 102 displays the available actions to the user 104 at 310. For example, the computing device 102 displays one or more hyperlinked user interface elements that execute the actions when activated by the user 104. The computing device 102 also hides or suppresses display of any actions that are not available for the selected content item 116 at 308.

If the computing device 102 receives a request from the user 104 to perform at least one of the displayed actions at 312, and if the third party application associated with the selected action is installed on the computing device 102 at 314, the computing device 102 executes the third party application at 316. To enhance the user experience, the computing device 102 uses the selected content item 116, at least a portion of the content item description 118 for the selected content item 116, and any other context as arguments to execution of the selected second application 112.

If the third party application associated with the selected action is not installed on the computing device 102 at 314, the computing device 102 directs the user 104 to an application marketplace or other location for offering (e.g., advertising), obtaining, installing, and enabling execution of the third party application at 318. After installation, the computing device 102 executes the third party application at 316.

Output data generated from execution of the third party application is provided for display to the user 104 within the context of the application that the user 104 was using to select the content item 116 at 304.

In an example of the operation of the computing device 102 in FIG. 3, the third party application provider 302 is an event ticket service, the cloud service 128 is a search engine, and the application data 114 for the event ticket service includes a set of events supported by the event ticket service. For example, the application data 114 may include the set of supported events and actions for the supported events including buy tickets, sell tickets, trade tickets, reserve parking, and any other actions supported by the event ticket service. The application data 114 may further include the identifier of the event ticket service and the identifier associated with each supported event in a database or catalog of the event ticket service. In some embodiments, the application data 114 further includes a set of events not supported by the event ticket service.

The event ticket service provides the cloud service 128 with the application data 114 as a feed. In this example, the user 104 browses the events as the content items 116 using a search engine or a calendar of events application. The content item descriptions 118, in this example, include a description of the event, dates, times, venues, and any other information distinguishing each event from the other events. As the user 104 browses the events, the computing device 102 displays an action icon to "buy tickets" if the currently viewed event is supported by the event ticket service per the application data 114 from the event ticket service. If the currently viewed event is not supported by the event ticket service, the computing device 102 omits or deactivates (e.g., blurs out, grays out, and/or renders the link nonfunctional) the action icon to "buy tickets."

Continuing the ticket example, the user 104 may opt to buy tickets for a particular event by activating the action icon to "buy tickets" (e.g., clicking on the icon). The computing device 102 executes a third party application associated with the event ticket service to complete the purchase transaction within the context of the search engine or calendar of events application. Output data from the completed transaction is also displayed in the context of the search engine or calendar of events application. Information about the completed transaction is provided by the third party application to the search engine or calendar of events application to enable relevant suggestions or recommendations to be made. For example, the third party application identifies one or more of the following: the action that occurred, details of the transaction (e.g., name, date, location, time, duration, and rating of the selected event), the quantity of tickets purchased, the cost paid, and the method of payment. The search engine or calendar of events application uses this completed transaction information to recommend or offer additional actions to the user 104 such as a restaurant recommendation in the neighborhood of the event location. The search engine or calendar of events application may also offer an action to book reservations for the restaurant at a time sufficiently prior to the start time of the event to enable the user 104 to have dinner and then attend the event.

In this example, booking the restaurant reservations may occur as an action provided by another third party application in the context of the search engine or calendar of events applications in the manner described herein.

Figure 4:
FIG. 4 is an exemplary user interface on a mobile computing device illustrating details about a movie showing in a theater.

Referring next to FIG. 4, an exemplary user interface 402 on a mobile computing device illustrates details about a movie showing in a theater. In this example, the user 104 browses a list of movies as the content items 116 and, for a particular movie selected by the user 104, the user interface 402 displays the title, genre, rating, and runtime for the selected content item 116 as the content item description 118.

Figure 5:
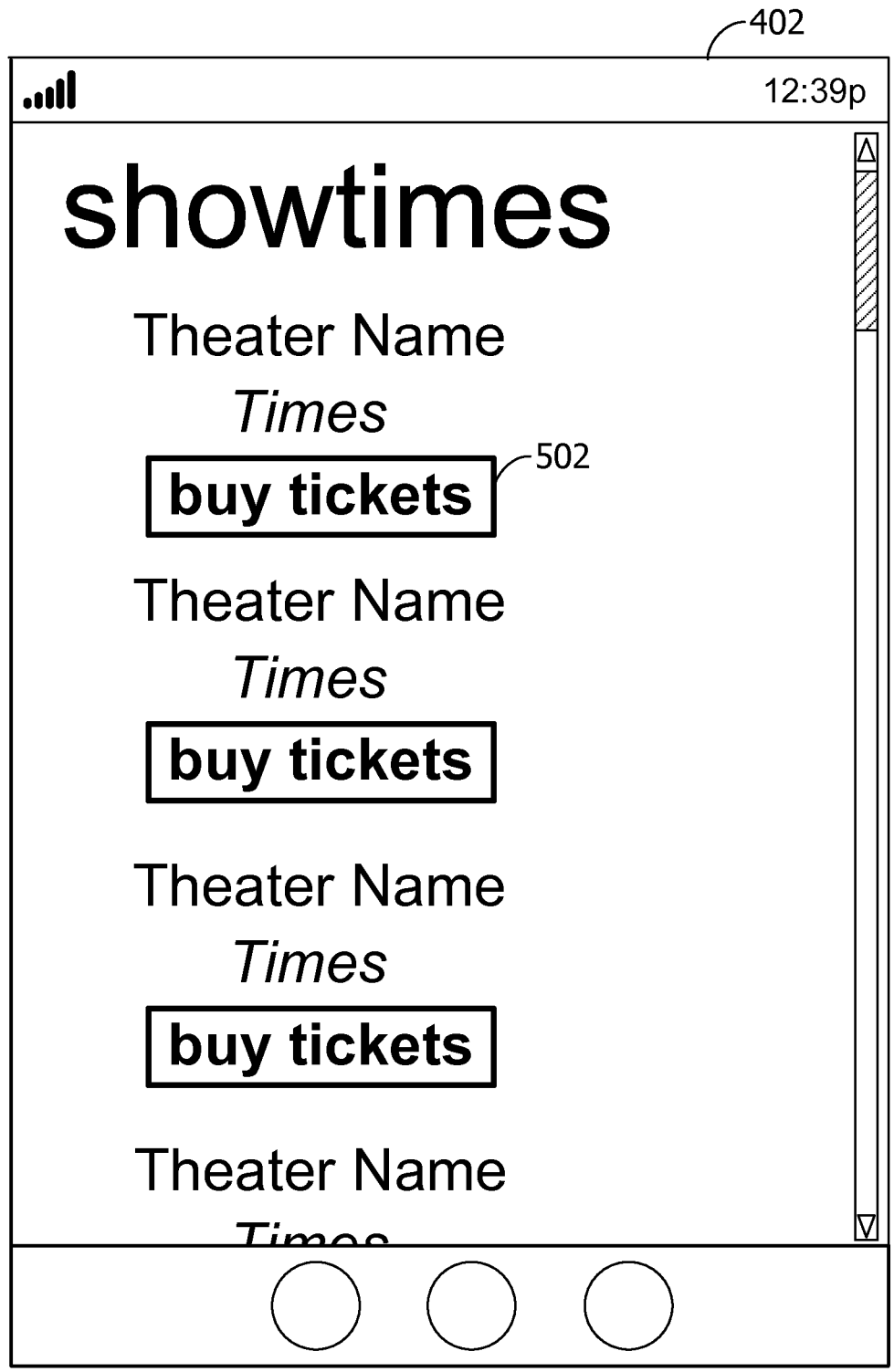
FIG. 5 is an exemplary user interface on a mobile computing device illustrating show times and theaters for the movie shown in FIG. 4.

Referring next to FIG. 5, the user interface 402 on the mobile computing device from FIG. 4 illustrates show times and theaters for the movie shown in FIG. 4. In this example, the user 104 has navigated to a "showtimes" page and is presented with a list of theaters showing the selected movie along with the show times available at each of the theaters. In addition, the mobile computing device displays to the user 104 an option to buy tickets if there is a third party application (e.g., the second application 112) that supports an action for purchasing tickets for the selected movie at a particular time at a particular theater. The option may be presented as a user interface element (e.g., icon 502) with the words "buy tickets." The third party applications, in this example, may be applications provided by the theaters.

Upon selecting or otherwise activating the "buy tickets" icon 502, the mobile computing device executes the third party application supporting the "buy tickets" action.

Figure 6:
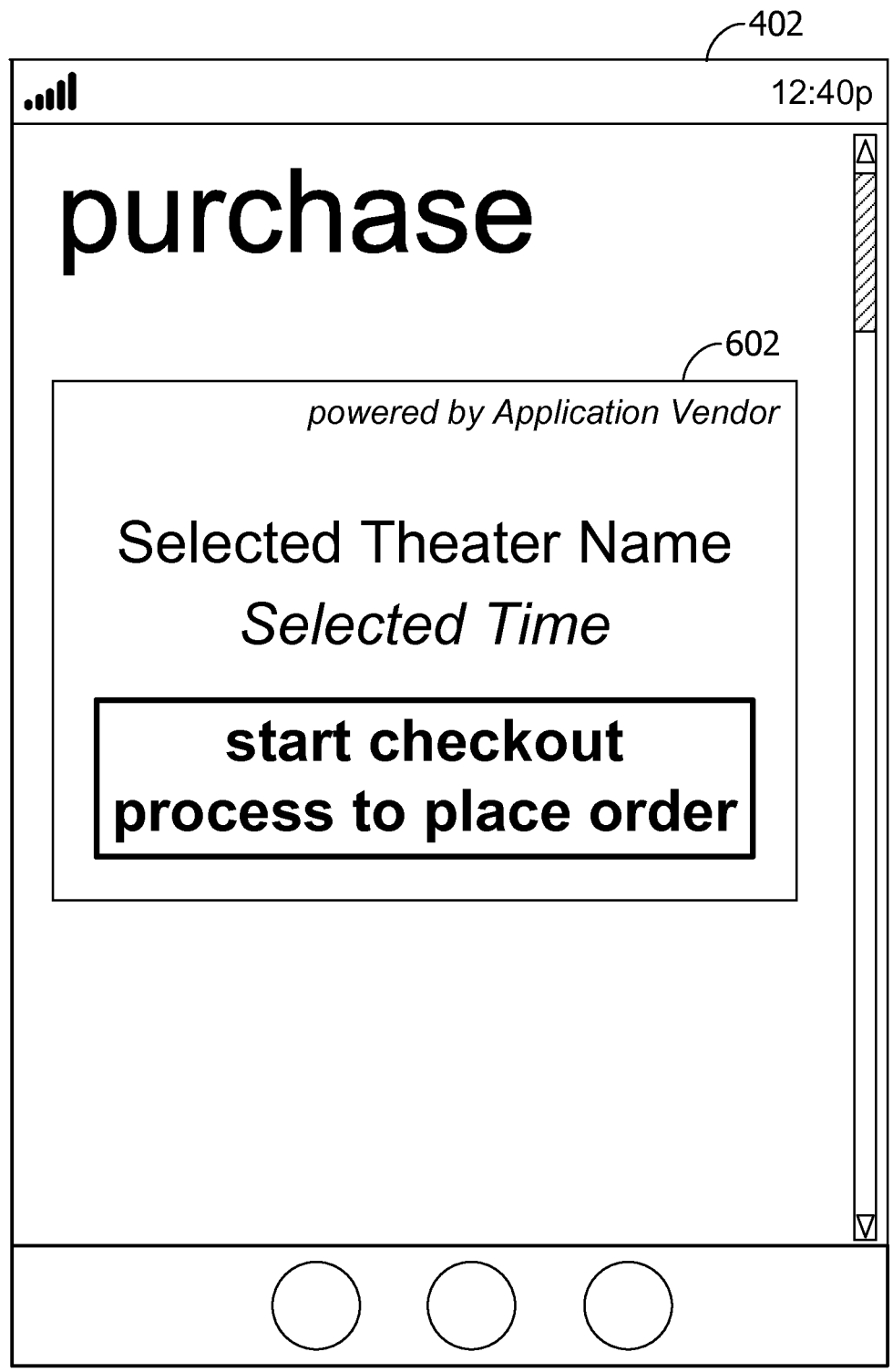
FIG. 6 is an exemplary user interface on a mobile computing device illustrating execution of a third party application for purchasing tickets for the movie shown in FIG. 4 at a theater shown in FIG. 5.

Referring next to FIG. 6, the exemplary user interface 402 on the mobile computing device illustrates execution of the third party application for purchasing tickets for the movie shown in FIG. 4 at a theater shown in FIG. 5. In the example of FIG. 6, the mobile computing device executes, and displays the output from, the third party application within the context of the application that was displaying the movies, show times, and theaters. For example, the output data is displayed within the user interface element 602.

The mobile computing device executes the third party application using the selected movie, selected show time, and selected theater name and location as arguments or parameters. For example, the mobile computing device populates any menus or fields of the third party application using this information. As an example, the launching parameters include the TheaterID (823), TheaterName (Big Cinema), TheaterLatitude (46.336247), TheaterLongitude (−132.274264), TheaterAddress (One Main Street), SelectedMovieName (Big Movie), Category (Movies).

Additional Examples

In some embodiments, one or more of the second applications 112 are provided by an operating system executing on the computing device 102, alternatively or in addition to the second applications 112 provided by the third party application provider 302. For example, the operating system includes these applications as uninstalled, yet available for installation upon request.

In an example scenario, the user 104 uses a search engine to find nearby restaurants (e.g., content items 116). The user 104 selects one of the results, and the computing device 102 displays details about the restaurant including address, rating, menu, reviews, photographs, and more (e.g., content item description 118). The computing device 102 compares the restaurant details with the application data 114 provided by reservation booking services (e.g., third party application providers 302) to identify a restaurant booking service that is applicable specifically for the selected restaurant. In some embodiments, the cloud service 128 performs the comparison to select one or more of the restaurant booking services.

The computing device 102 then displays a user interface element, within the context of the search engine, enabling the user 104 to activate or select the functionality provided by the selected restaurant booking service (e.g., reserve a table). The process for reserving the table is performed within the context of the search engine, and the selected restaurant booking service (e.g., application executing on the computing device 102) is populated with the details of the selected restaurant name, preferred time, etc. to provide a fluid and uninterrupted user experience.

At least a portion of the functionality of the various elements in FIG. 1 and FIG. 3 may be performed by other elements in these figures, or an entity (e.g., processor, web service, server, application program, computing device, etc.) not shown in these figures.

In some embodiments, the operations illustrated in FIG. 2 and FIG. 3 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 104. In such embodiments, notice is provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer readable storage media and communication media. Computer readable storage media store information such as computer readable instructions, data structures, program modules or other data. Computer readable storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for identifying the second application 112 to provide functionality specific to the selected content item 116, and exemplary means for selectively providing relevant functionality from the plurality of second applications 112 based on the description of the selected content item 116 distinguishing the selected content item 116 from other content items 116 in the same category.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for providing, through a first application, functionality from a plurality of second applications, said functionality being specific to a selected content item, said system comprising:
   a memory area associated with a mobile computing device, said memory area storing application data describing one or more actions supported by the plurality of second applications, wherein the memory area further stores a description associated with a plurality of content items, the plurality of content items being assigned to one of a plurality of categories, the description including elements distinguishing the associated content item from other content items assigned to the same category; and
   a processor programmed to:
      display, by the first application executing on the mobile computing device, one or more of the plurality of content items to a user;
      receive, by the mobile computing device from the user, a selection of at least one of the displayed content items;
      perform a comparison between the description associated with the selected content item and the application data stored in the memory area;
      select at least one of the plurality of second applications based on the performed comparison between the description associated with the selected content item and the application data stored in the memory area;
      display to the user one or more of the following: the selected content item, at least a portion of the description associated with the selected content item, and at least one of the actions supported by the selected second application;
      receive a request from the user to perform said at least one of the actions supported by the selected second application;
      in response to the received request, execute the selected second application to perform said at least one of the actions using the selected content item and at least a portion of the description associated with the selected content item as input to the selected second application, wherein execution of the selected second application produces output data; and
      display the output data to the user within the context of the first application.

2. The system of claim 1, wherein the memory area further stores one or more of the plurality of second applications installed on the mobile computing device.

3. The system of claim 1, wherein the processor is further programmed to:
   receive the application data that describes the one or more actions supported by the plurality of second applications from a plurality of third party application providers.

4. The system of claim 1, wherein each of the plurality of second applications provides a functionality different from that provided by other of the plurality of second applications.

5. The system of claim 1, wherein displaying the output data to the user within the context of the first application comprises displaying the output data without loading an additional screen for the second application.

6. The system of claim 1, wherein the processor is further programmed to offer a download of the selected second application if the selected second application is not installed on the mobile computing device.

7. The system of claim 1, further comprising means for identifying the second application to provide functionality specific to the selected content item wherein displaying the output data to the user within the context of the first application comprises conserving battery life and bandwidth by preserving an execution context of the first application.

8. The system of claim 1, further comprising means for selectively providing relevant functionality from the plurality of second applications based on the description of the selected content item distinguishing the selected content item from other content items in the same category.

9. A method comprising:
   receiving, by a computing device from a user, a selection of at least one of a plurality of content items displayed by a first application, said selected content item belonging to a category;
   defining a description of the selected content item, said description distinguishing the selected content item from other content items in the same category;
   comparing the description of the selected content item with application data, the application data identifying actions supported by a plurality of second applications;
   selecting at least one of the plurality of second applications based on the comparison between the defined description and the application data;
   providing, for display to the user by the computing device, the selected content item, at least a portion of the defined description, and one or more actions supported by the selected second application;

receiving a request from the user to perform at least one of the actions supported by the selected second application;

in response to the received request, executing, by the computing device, the selected second application to perform said at least one of the actions using the selected content item as input to the selected second application to produce output data; and providing the output data to the user for display within the context of the first application.

10. The method of claim 9, wherein selecting the at least one of the plurality of second applications comprises:

identifying the selected content item to a cloud service; and receiving identification of the at least one of the plurality of second applications from the cloud service, said at least one of the plurality of second applications being selected by the cloud service based on a comparison between the defined description and the application data.

11. The method of claim 9, wherein the first application uses the output data from the second application to provide additional actions associated with the second application within the execution context of the first application to the user.

12. The method of claim 9, wherein executing the selected second application comprises receiving the output data from a third party application provider hosting the selected second application.

13. The method of claim 9, wherein selecting the at least one of a plurality of second applications based on the comparison comprises selecting the at least one of a plurality of second applications based on a comparison performed by one or more of the following: the computing device and a cloud service.

14. The method of claim 9, further comprising identifying the selected second application to the user prior to receiving the request from the user to perform at least one of the actions associated with the selected second application.

15. The method of claim 9, wherein defining the description comprises obtaining the description from a cloud service.

16. The method of claim 9, wherein the plurality of content items comprises a set of search results, and further comprising providing the search results to the user for display.

17. The method of claim 9, further comprising:

determining that the selected second application is not installed on the computing device, wherein the selected second application is provided by a third party application provider; and offering to install the selected second application on the computing device, wherein the selected second application is provided.

18. One or more computer readable storage media embodying computer-executable components, said components comprising:

a user interface component that when executed causes at least one processor to receive, from a user, a selection of at least one of a plurality of content items displayed by a first application, said selected content item associated with a category;

a comparison component that when executed causes at least one processor to select a plurality of second applications by matching a description of the selected content item to application data associated with the second applications, the application data describing one or more actions supported by the plurality of second applications, said description distinguishing the selected content item from other content items associated with the same category, each of the selected plurality of second applications providing functionality different than that provided by other selected second applications, wherein the user interface component further:

displays to the user the selected content item and the plurality of second applications selected by the comparison component; and receives a request from the user to execute one or more of the selected second applications; and a launch component that when executed causes at least one processor to execute, in response to the request received by the user interface component, said one or more of the selected second applications using the selected content item as input to produce output data, wherein the user interface component displays to the user, within the context of the first application, the output data produced by the launch component.

19. The computer readable storage media of claim 18, wherein the user interface component further:

displays to the user one or more actions associated with the second applications selected by the comparison component; and receives from the user a request to perform at least one of the displayed actions, wherein the launch component executes said one or more of the selected second applications to perform said at least one of the displayed actions requested by the user.

20. The computer readable storage media of claim 18, wherein the user interface component receives the request from the user to execute one or more of the selected second applications by detecting a selection by the user of a user interface element corresponding to at least one of said one or more of the selected second applications, wherein the user interface elements comprise one or more of the following: text, an icon, a hyperlink, and an animation.

* * * * *